Feb. 27, 1923.
F. BUSH.
FENDER.
FILED OCT. 10, 1922.
1,447,061.
2 SHEETS—SHEET 2.
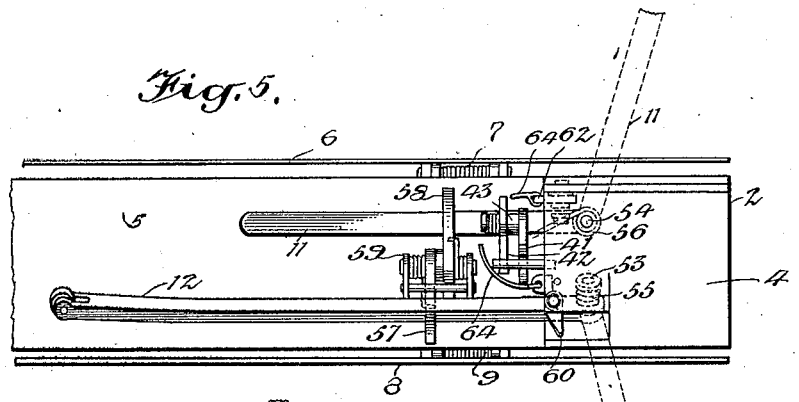
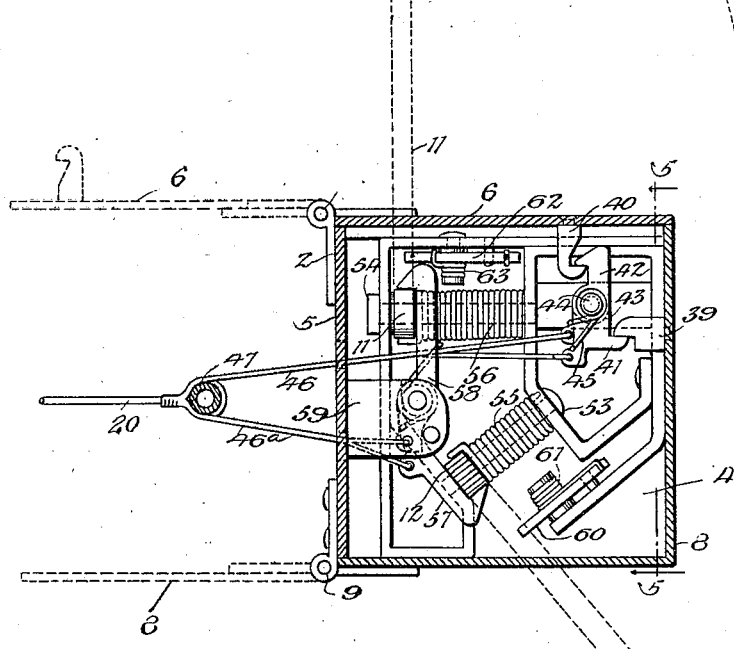
WITNESSES
INVENTOR
Fred Bush
BY
ATTORNEYS Patented Feb. 27, 1923.

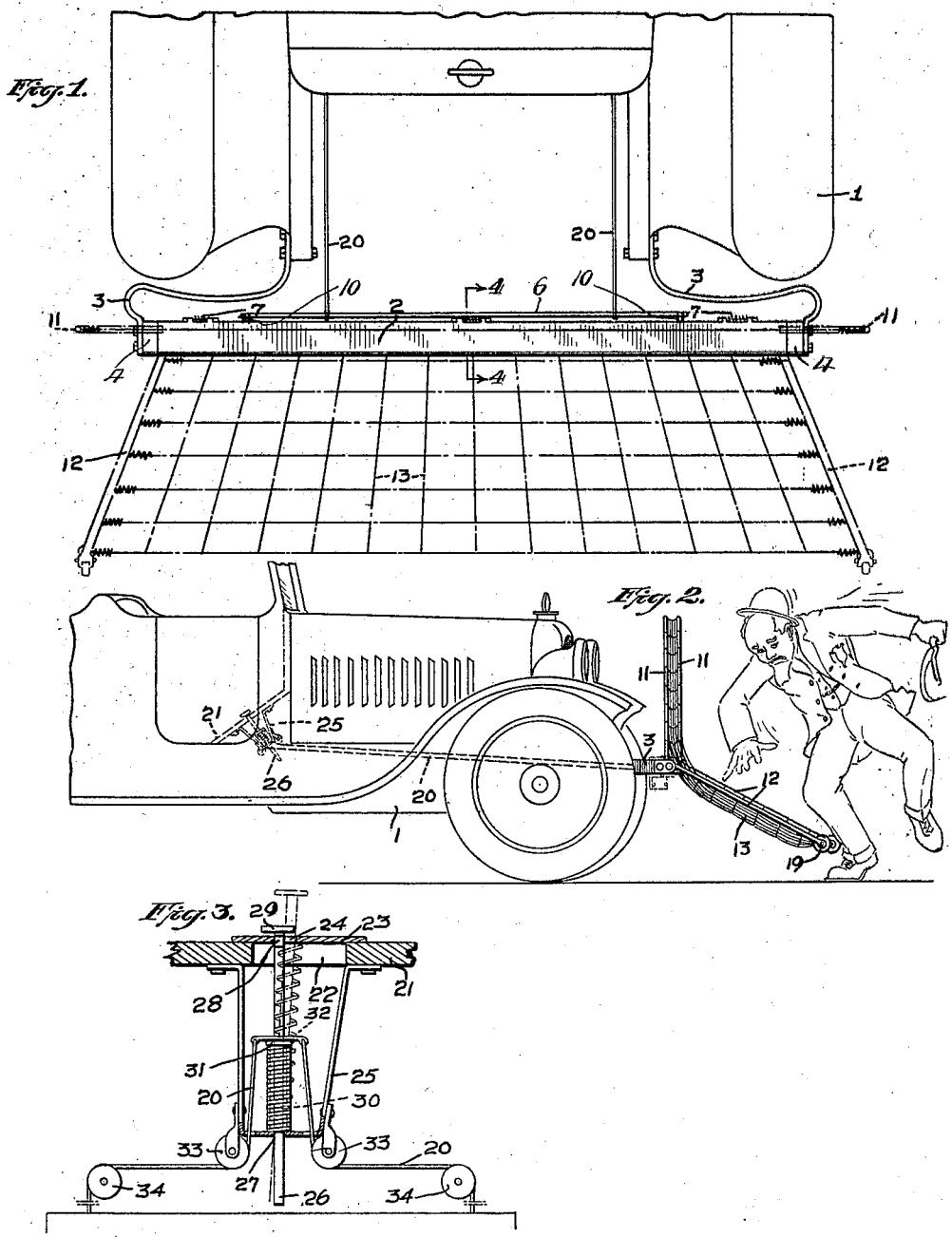

1,447,061

UNITED STATES PATENT OFFICE.

FRED BUSH, OF PRESSMEN'S HOME, TENNESSEE.

FENDER.

Application filed October 10, 1922. Serial No. 593,620.

*To all whom it may concern:*

Be it known that I, FRED BUSH, a citizen of the United States, and a resident of Pressmen's Home, in the county of Hawkins and State of Tennessee, have invented a new and Improved Fender, of which the following is a full, clear, and exact description.

This invention relates to improvements in collapsible fenders for automobiles, an object of the invention being to provide an improved fender which is normally concealed within the bumper bar of an automobile, and which may be quickly moved to operative position to prevent injury to pedestrains or live stock which may inadvertently get in the path of the machine.

A further object is to provide an improved spring operated device of this character and to provide improved pedal controlled means for operating the same from the driver's seat in the automobile.

A still further object of the invention is to provide a fender of the pick-up type which will be practical in construction, strong, durable and efficient in use, and which may be quickly operated in case of emergency.

With these and other objects in view the invention consists in certain novel features of construction, and combinations and arrangements of parts, as will be more fully hereinafter described and pointed out in the claims.

In the accompanying drawings—

Figure 1 is a fragmentary top plan view of the forward portion of an automobile illustrating my improved hollow fender carrying bumper bar in position therein, the dotted lines indicating the position assumed by the fender when released from the bumper bar.

Fig. 2 is a fragmentary view in side elevation of the forward portion of an automobile illustrating my improved fender in operative position to catch a pedestrian.

Fig. 3 is an enlarged detail view of the operating mechanism.

Fig. 4 is an enlarged view in transverse section through the bumper bar on the line 4—4 of Fig. 1.

Fig. 5 is a fragmentary broken sectional view on the line 5—5 of Fig. 4.

Fig. 6 is a detail in longitudinal section showing the connection of a net element with the swingable side arms.

Referring in detail to the drawings, 1 represents an automobile and 2 my improved hollow fender carrying bumper bar which is supported on and spaced from the forward end of the machine in the customary position by suitable supporting arms or brackets 3.

The bumper bar 2 is preferably of rectangular shape in cross section. Blocks 4 rigidly connected to the brackets 3 constitute the end walls of the hollow bumper and are connected by a rear wall 5. The top wall 6 of the bumper is hingedly connected to the rear wall 5 by suitably spring hinges 7 and is adapted to swing upwardly and rearwardly. As shown most clearly in Figs. 3 and 4, a single sheet of material 8 bent along longitudinal lines to give the desired angular formation constitutes the bottom and front walls of the bumper bar, and is connected by spring hinges 9 to the rear wall 5. The free edges of the wall 6 and the sheet 8 are normally secured to the end blocks 4 by snap fasteners 10, or other appropriate fragile fastening means.

My improved collapsible fender, normally retained in folded position and concealed within the bumper bar, comprises a pair of upwardly and laterally swinging arms 11, and a pair of downwardly, laterally and forwardly swinging arms 12. The arms 11 and 12 are adapted to support any suitable form of net 13, between them, as shown clearly in Figs. 1 and 2.

As shown clearly in Fig. 4, on the inside of the front wall member of the hollow bumper is a catch 39 and on the inside of the cover 6 is a catch 40, said catches being adapted to be connected by latch heads 41 and 42 on a latch 43 rockable on a pivot 44 and subject to a spring 45. A branch 46 of a pull-cord 20 extends to latch 43 so that a rearward pull on cable 20 will release such latch against spring 45, whereupon the parts 6 and 8 of the bumper-casing will be swung by spring hinges 7 and 9 to the positions shown in broken lines.

As shown best in Figs. 4 and 5, the net-spreading arms 11 and 12 are subject to torsion springs 55 and 56, tending to throw said arms on their short-rod pivots 53 and 54 to their positions to spread the net as shown in Fig. 1. A latch 57 holds each arm 11 retracted and a latch 58 similarly holds each arm 12. The latches 57 and 58 are pivoted on a bracket 59 on the back wall 5 of the bumper. These latches 57 and 58 are simultaneously released, on pulling the cord 20 as aforesaid, by means of a branch 46ᵃ of said connection leading to both latches. A latch 60 subject to torsion spring 61 serves to hold each arm 12 in net-spreading position, and a similar latch 62 subject to a torsion spring 63 serves to hold each arm 11 in net-spreading position. Manually operated pull-cords 64 (Fig. 5) run to both latches 60 and 62 to facilitate releasing the latches preparatory to folding in arms 11 and 12, whenever desired.

In Fig. 6 is illustrated a preferred way of connecting the strands of net 13 to the arms 11 and 12. As shown here in the case of an arm 12, such a strand, marked 13′, has swiveled thereon, at its arm-adjacent end, an eye 13″, such eye being connected by a special spring fixture to an eye-bolt set in the arm. Such fixture may conveniently be formed of a single length of metal one portion of which is formed as a serpentine spring element 13ᵇ and the other portion of which is helically wound in spaced relation around the first spring to constitute a cylindrical coil spring element 13ᵃ. In this way a combined spring suspending and shock-absorbing connector is provided, a very simple and inexpensive construction.

As indicated best in Fig. 4, the outward swinging movement of the arms 11 and 12 is limited by the walls of suitable recesses in the blocks 4.

As shown in Figs. 1 and 2, the free ends of the arms 12 are provided with rollers 19 for contacting the rod when a pedestrian is tripped and caught by net 13.

Any suitable means for operating the cable 20 may be provided. I do not wish to be limited in this particular although I have illustrated in Fig. 5 one practical operating mechanism.

In Fig. 3, 21 represents the floor of the automobile 1 which is formed with an opening 22 therein. A metal plate 23, secured over the opening 22 is provided with a keyhole slot 24. A depending U-shaped metal hanger 25 has its arms located at opposite sides of the opening 22, and is provided at its intermediate portion with an opening 27 registering with the opening 22. A plunger rod 26 movable through the opening 27 and through the larger end of the keyhole slot 24 is provided with a reduced portion 28 movable in the narrower portion of the slot 24. A pedal 29 is secured to the upper end of the plunger, and a coil spring 30 around the plunger is confined between a disk 31 fixed to the plunger and the intermediate portion of the hanger 25. A yoke 32 carried by the disk receives the intermediate portion of the cable 20.

The ends of the cable are passed around pulleys 33 secured to the hanger 25 and lead through any suitable series of supporting pulleys 34 to connection with branches 46 and 46ᵃ as shown in Fig. 4.

The operation is as follows: The fender is normally concealed within the closed bumper bar as shown in full lines in Figs. 4 and 5. Should the driver of the car see a pedestrian in imminent danger of being run over he kicks the pedal 29 to one side so that the plunger rod 26 moves freely upwardly through the slot 24, being actuated by the spring 30. This expansion of the spring carries the disk 31 and yoke 32 upwardly, exerting a pull on the cable 20 as will readily be understood. Since the ends of the cable are operatively connected to the latches 41, 42, 57 and 58, the latter all simultaneously release the bumper wall-members 6 and 8 and the arms 11 and 12, said wall-members ripping clear of the fragile fasteners 10 of Fig. 1 and flying out to their broken-line positions of Fig. 4, and the arms springing out to the operative position illustrated in Figs. 4 and 5 in broken lines, to spread the net as shown in Figs. 1 and 2. The members 6 and 8 will be held in this open position by the spring hinges 7 and 9. The pedestrian will be tripped by the forward edge of the net 14 and thrown into the net, and his weight will bring the rollers 19 into contact with the ground. The rollers 19 serve to prevent buckling of the slightly bendable arms 12, which might be caused by the arms having their forward ends forced into a dirt road by a weight in the net.

This fender, of course, does not insure safety to pedestrians, but in any event it saves them from being run over or from being seriously injured by flying glass from the headlights.

After the plunger rod 26 has been forced back to its normal locked position, the fender may be manually restored to its set position within the bumper bar during the maintenance of a pull on cords 64 connected to latches 60 and 62.

While I have illustrated one of the preferred embodiments of my invention it will be apparent that various slight changes might be made in the general form and arrangement of the parts described without departing from the invention, and hence I do not limit myself to the precise details set forth but consider myself at liberty to make such changes and alterations as fairly fall within the spirit and scope of the appended claims.

I claim:

1. The combination with a hollow bumper bar including blocks at its ends and a plurality of hinged wall sections adapted to be locked together to form a casing, of a collapsible fender located within the casing, said fender including a plurality of arms, short rods mounted in the blocks, each of said arms pivotally connected at one end to one of the rods, torsion springs around the rods tending to swing the arms outwardly, trigger means for retaining the arms in folded position, and a net carried by the arms.

2. The combination with a hollow bumper bar including blocks at its ends and a plurality of hinged wall sections adapted to be locked together to form a casing, of a collapsible fender located within the casing, said fender including a plurality of arms, short rods mounted in the blocks, each of said arms pivotally connected at one end to one of the rods, torsion springs around the rods tending to swing the arms outwardly, trigger means for retaining the arms in folded position, a net carried by the arms, and means for releasing the arms to spread the net.

3. The combination with a housing including a series of hinged sections and fragile means locking said sections together, of a collapsible fender including a plurality of spring held arms, means for locking the arms in folded position within the housing against the force of the springs, said arms upon their release automatically striking against said hinged sections and forcing open said fragile locking means.

FRED BUSH.